Figure 1:
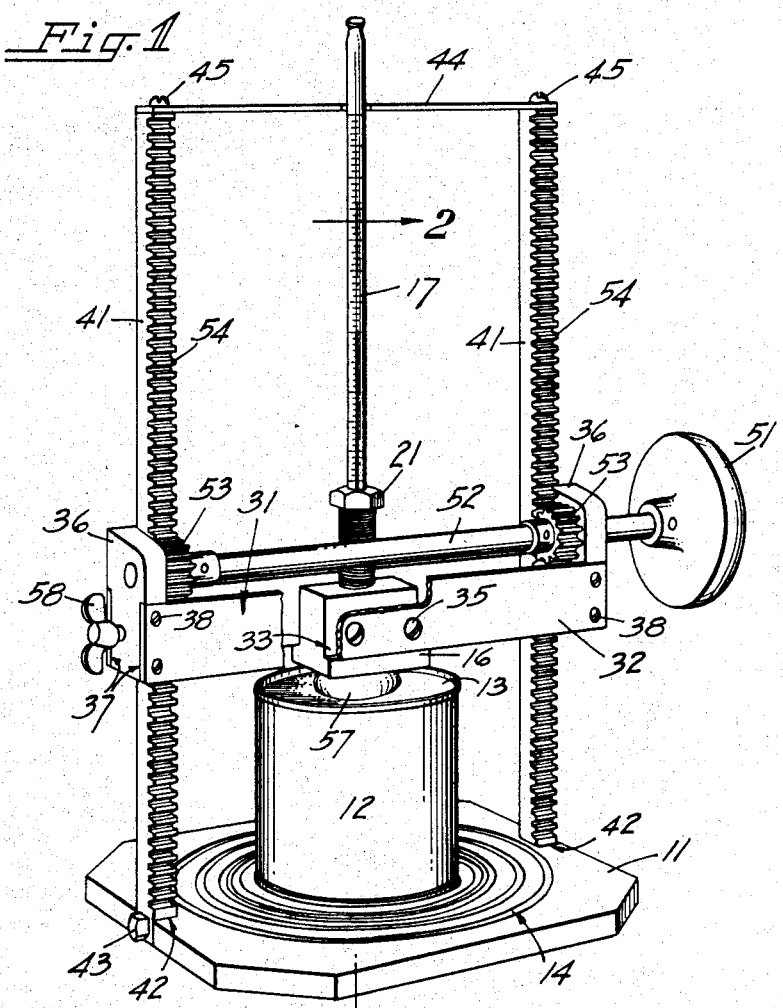

April 7, 1936.   H. A. BENJAMIN   2,036,618

TEMPERATURE MEASURING APPARATUS

Filed Oct. 26, 1934

INVENTOR
Howard A. Benjamin
BY
ATTORNEYS

Patented Apr. 7, 1936

2,036,618

UNITED STATES PATENT OFFICE 2,036,618

TEMPERATURE MEASURING APPARATUS

Howard A. Benjamin, Maywood, Ill., assignor to American Can Company, New York, N. Y., a corporation of New Jersey Application October 26, 1934, Serial No. 750,231

10 Claims. (Cl. 73—52)

The present invention relates to a temperature measuring apparatus and has particular reference to such an apparatus which will show the temperature of the contents of a sealed can or container by puncturing a wall of the can and inserting a temperature measuring instrument into the can interior without loss of heat or pressure from the can.

An object of the invention is the provision of a temperature measuring apparatus for ascertaining the temperature at any desired point in the contents of a sealed container.

Another object of the invention is the provision of such an apparatus which prevents loss of heat or pressure from the can during the temperature measurement of its contents.

Another object is the provision of an apparatus of the character described which is utilized to measure temperatures without disturbing or displacing the contents in the can to the end that the degree of heat penetration of processed cans may be accurately determined and true sectional temperature measurements obtained.

Numerous other objects and advantages of the invention will be apparent as it is better understood from the following description, which, taken in connection with the accompanying drawing, discloses a preferred embodiment thereof.

Figure 2:
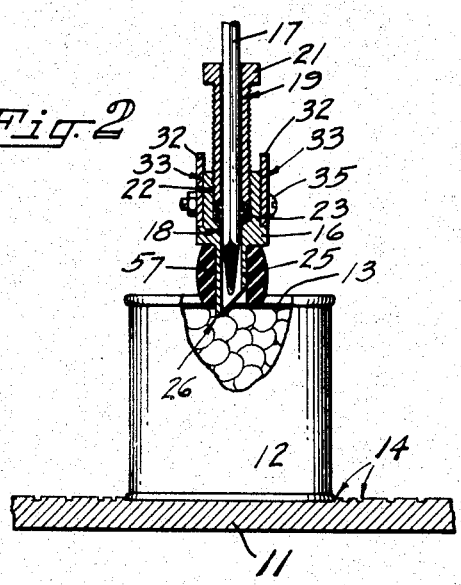
Figure 3:
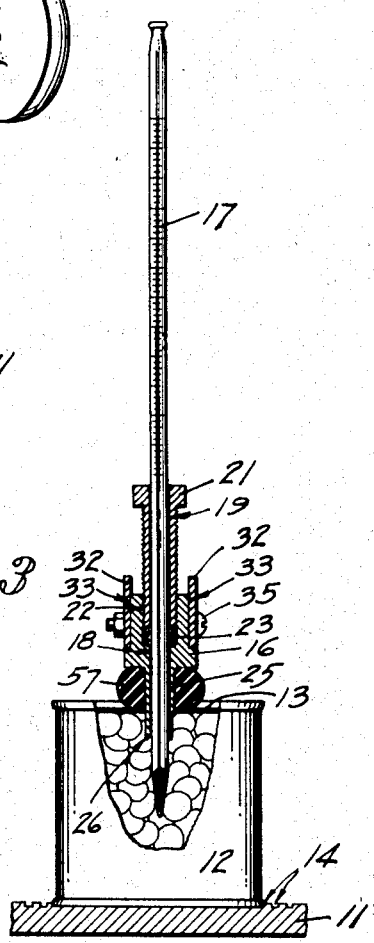

Referring to the drawing:

Figure 1 is a perspective view of an apparatus embodying the instant invention parts being broken back; and Figs. 2 and 3 are sectional views taken substantially along the line 2—2 in Fig. 1, showing a filled and sealed container, partly broken away, the two views showing different positions of certain of the apparatus parts.

In the apparatus, illustrated in the drawing as a preferred embodiment of the invention, a can to be tested for its internal temperature is positioned under a vertically movable piercing element, which is manually actuated to move down and pierce or puncture a wall of the can and to then enter its interior. The piercing may be effected in any suitable part of the can walls depending upon what part of the contents is to be measured for temperature. In canning practice it is usually the center of the can contents that is to be measured and in that case the piercing is done in one of its ends near the center.

As the piercing element is moved into piercing position relative to the can, a resilient sealing ring surrounding it engages the can wall and seals off a predetermined area. The can wall can thereafter be punctured within this enclosed area without loss of internal heat or pressure and also without displacing or disturbing the contents.

The piercing element is preferably tubular and supports and protects the sensitive end of the temperature measuring instrument which it carries into the can through the pierced opening. After the initial entrance, the measuring instrument is further inserted beyond the end of the piercing element and its sensitive end is moved into the contents at the desired position so that the temperature at that point may be ascertained.

The disclosed embodiment of the invention comprises a base or table 11 which provides the support for a sealed can 12 to be tested and on which the bottom of the vessel to be tested may rest, this can having ends 13. In the drawing the can is shown in upright, central position on top of the table which is the proper position to obtain a temperature reading of the center of its contents.

Centrally locating the can is readily effected by the provision of concentric grooves 14 which are cut in the top face of the table. The different diameter sizes of grooves correspond with the different diameter sizes of cans and therefore any size of can within the range of sizes is quickly and effectively located.

In such a position the center of the can 12 is directly under an instrument holder block 16 which carries a temperature measuring instrument 17 which is shown in the drawing as a graduated stem thermometer. An electric thermo-couple or the like would be equally satisfactory.

Thermometer 17 is disposed in a vertical bore 18 formed in the holder block 16 and is supported in an upright position within a central bore 19 formed in a stuffing box nut 21. One end of the nut threadedly engages within a stuffing box bore 22 formed in the holder block and concentric with the bore 18. The bottom end of the nut compresses and holds a suitable packing material 23 located in the bore 22 and surrounding and hermetically sealing the thermometer in position, yet permitting its independent movement when desired.

The lower or sensitive end of the thermometer 17 projects below the holder block 16 and into a cylindrical can piercing element 25. Element 25 is formed integrally with the holder block and depends from its bottom side, its central bore forming a continuation of the bore 18. The lower rim of the piercing element is inclined toward one side and terminates in a sharp point 26.

This tubular piercing element 25 protects the lower end of the thermometer while puncturing the can top and makes an opening in the can wall large enough for the insertion of the thermometer 17 into the can interior.

This is effected by lowering of the piercing element and its associated holder block 16. The holder block is secured near the center of a crosshead 31 which consists of a pair of spaced parallel bars 32 constituting a transverse support for the testing part of the apparatus and which seat in notches 33 cut in the front and rear faces of the holder block. These bars and the holder block are tied together by bolts 35.

The ends of the support, or cross-head bars 32, are secured to a pair of slide blocks 36 (Fig. 1) which are notched at 37 for that purpose and bars and blocks are tied together by bolts 38. Slide blocks 36 engage outer opposite faces of a pair of square vertically disposed guide rods 41. The lower ends of these rods seat within notches 42 formed in the table 11 and are secured in position by cap screws 43. The upper ends of the guide rods are tied together and are held in spaced relation by a tie bar 44 the ends of which are secured to the top ends of the guide rods by screws 45.

The cross-head 31 and slide blocks 36 are moved up and down as a unit on the guide rods 41 by a rack and pinion device which is manually actuated by a hand wheel 51. The handwheel is mounted on one end of a horizontal shaft 52 which is carried in the slide blocks. Adjacent each slide block a pinion 53 is mounted on the shaft and the teeth of these pinions mesh with rack teeth 54 formed in the front face of each of the guide rods. Rotation of the handwheel 51 turns the pinions 53 which ride over the rack teeth 54 and raise or lower the cross-head as desired.

In making a temperature test on a can positioned on the table 11, the handwheel 51 is rotated and the cross-head 31 is lowered and during such movement the sharp point 26 of the piercing element is plunged through the can top 13. Also during this movement and just prior to this piercing action the can end wall area immediately adjacent the piercing element is sealed off so that as the piercing proceeds heat and pressure cannot escape from the can.

The sealing is effected by a resilient collar 57 preferably made of rubber which surrounds and tightly engages the cylindrical piercing element. Just prior to the puncturing of the can as the piercing element moves down, the lowermost edge of the resilient collar engages the top surface of the can wall and thereafter further downward movement of the piercing element compresses the collar tightly against the can end wall and effectively seals the punctured area.

When the cross-head 31 has reached its fully lowered position (Fig. 3) it is locked by a thumb screw 58 (Fig. 1) which is threadedly engaged in the side of one of the slide blocks 36. The thumb screw when tightened into locking position projects through the slide block and its end abuts against the side of the adjacent guide rod 41, effectively holding the cross-head against either up or down movement.

The thermometer 17 is then pushed down into the can interior and among the contents to the desired depth (Fig. 3). It is allowed to remain in such position a sufficient length of time to obtain an accurate measurement of the temperature, its sensitive end being at the exact place where the temperature of the contents is sought. The measurement of temperature may then be read directly from the graduated stem extending above the nut 21.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. An apparatus for measuring the temperature of the contents of a sealed container which comprises, a temperature measuring instrument, and means for holding said temperature measuring instrument and for piercing a wall of said container so that said instrument may be inserted into the interior of said container through the opening so formed, a base on which the bottom of the container to be tested may rest, a transverse support for the said instrument, and means for adjusting said support on said base according to the height of the container.

2. An apparatus for measuring the temperature of the contents of a sealed container which comprises, a temperature measuring instrument, a holder for slidably retaining said instrument in an airtight joint, and a container piercing element carried by said holder for puncturing a wall of said container through the opening of which said instrument may be slid in said holder and moved into the interior of said container wihout leakage of internal container pressure through said joint, a base on which the container to be tested may rest, a transverse support for the said holder, and means for adjusting said support on said base according to the height of the containing.

3. An apparatus for measuring the temperature of the contents of a sealed container which comprises, means for piercing a wall of said container, and means for inserting a temperature measuring instrument info the interior of said container through the opening so formed, a base on which the bottom of the container to be tested may rest, a transverse support for the said instrument, and means for adjusting said suport on said base according to the height of the container.

4. An apparatus for measuring the temperature of the contents of a sealed container which comprises, means for piercing a wall of said container, means for inserting a temperature measuring instrument into the interior of said container through the opening so formed, and means for sealing said wall around said piercing means to prevent loss of heat and pressure from the interior of said container, a base on which the bottom of the container to be tested may rest, a transverse support for the said instrument, and means for adjusting said support on said base according to the height of the container.

5. An apparatus for measuring the temperature of the contents of a sealed container which comprises, a temperature measuring instrument, means for piercing a wall of said container to provide an opening therethrough, and means for sealing said wall around said piercing means and around said opening so that said instrument may be inserted into the interior of said container through the opening so formed and while said pierced wall is sealed to prevent loss of heat and pressure from the interior of said container, a base on which the bottom of the container to be tested may rest, a transverse support for the said instrument, and means for adjusting said support on said base according to the height of the container.

6. An apparatus for measuring the temperature of the contents of a sealed container which comprises, a holder for a temperature measuring instrument, means associated with said holder for engaging a wall of said container and for sealing off an end of the said temperature measuring instrument, and a container piercing element associated with said holder for puncturing said engaged wall within the confines of said sealing means, said piercing element also protecting and carrying the end of the measuring instrument into the container, a base on which the container to be tested may rest, a transverse support for the said holder, and means for adjusting said support on said base according to the height of the container.

7. An apparatus for measuring the temperature of the contents of a sealed container which comprises, a holder and a temperature measuring instrument, means associated with said holder for engaging a wall of said container and for sealing off the end of the said temperature measuring instrument, and a container piercing element associated with said holder for puncturing said engaged wall within the confines of said sealing means and for protecting and carrying the end of the measuring instrument into the container contents, said piercing element having an open piercing end through which the end of said measuring instrument may be further inserted into said contents.

8. An apparatus for measuring the temperature of the contents of a sealed container which comprises, a table for supporting said container during measurement, a movable holder and a temperature measuring instrument, a resilient sealing member associated with said holder for engaging a wall of said container and for sealing off a predetermined area of said wall, a container piercing element associated with said holder for puncturing said engaged wall within its sealed area, and means for moving said holder, said means comprising a transverse support and gearing for simultaneously adjusting both ends of said support relative to the container, its associated sealing member and piercing element into sealing and puncturing engagement with said wall and at the same time inserting the sensitive end of said measuring instrument into the container contents.

9. An apparatus for measuring the temperature of the contents of a sealed container which comprises, a table for supporting said container during measurement, a movable holder and a temperature measuring instrument, a resilient sealing member associated with said holder for engaging a wall of said container and for sealing off a predetermined area thereof, a container piercing element associated with said holder for puncturing said engaged wall within its sealed area, a transverse support for the holder means for moving said support, its associated sealing member and piercing element into sealing and puncturing engagement for inserting the end of said piercing element and said measuring instrument into the container contents, and means for clamping said transverse support to maintain the holder and said piercing element in such sealed and inserted position.

10. An apparatus for measuring the temperature of the contents of a sealed container, having, in combination, a device for piercing the top of said container, a thermometer carried by said piercing device, a base on which the bottom of the container may rest, and actuating means connected with the base for pressing the piercing device towards said base and into said container.

HOWARD A. BENJAMIN.